United States Patent [19]

Frantom

[11] 4,294,467
[45] Oct. 13, 1981

[54] SEAT BELT COMFORT DEVICE

[75] Inventor: Richard L. Frantom, Richmond, Mich.

[73] Assignee: Allied Chemical Corporation, Morris Township, Morris County, N.J.

[21] Appl. No.: 82,397

[22] Filed: Oct. 5, 1979

[51] Int. Cl.³ .............................................. B60R 21/10
[52] U.S. Cl. ...................................... 280/801; 24/171
[58] Field of Search .............................. 280/801–808; 24/170, 171, 194, 196; 297/469, 474–480

[56] References Cited

U.S. PATENT DOCUMENTS

| 4,065,156 | 12/1977 | Tanaka et al. | 280/807 |
| 4,091,508 | 5/1978 | Yamada et al. | 280/808 |
| 4,108,471 | 8/1978 | Kondo et al. | 280/807 |
| 4,113,280 | 9/1978 | Arai et al. | 280/807 |
| 4,116,402 | 9/1978 | Nomura et al. | 280/807 |
| 4,130,252 | 12/1978 | Mori et al. | 280/807 |
| 4,130,255 | 12/1978 | Sasaki et al. | 280/806 |
| 4,159,084 | 6/1979 | Mori et al. | 280/806 |

FOREIGN PATENT DOCUMENTS 2005130  4/1979  United Kingdom .

Primary Examiner—Joseph F. Peters, Jr.
Assistant Examiner—Randall A. Schrecengost
Attorney, Agent, or Firm—Roger H. Criss

[57] ABSTRACT

A seat belt comfort device located in the tongue and buckle interconnection which eliminates the tension exerted by the rewind force of a seat belt retractor. The comfort device is manually actuable between engaged and disengaged positions with the seat belt. Preferably, the comfort device is automatically disengaged when the tongue is inserted into the buckle and when the tongue is released from the buckle.

17 Claims, 7 Drawing Figures

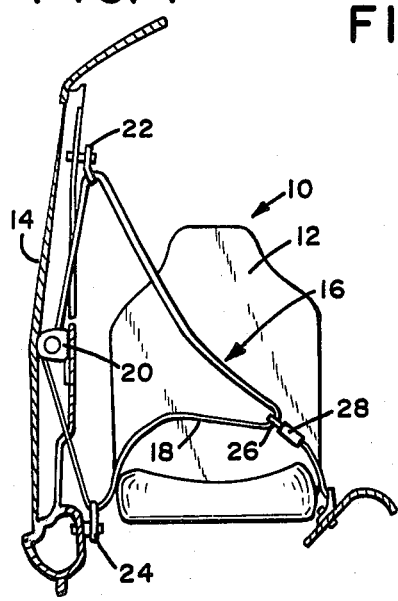
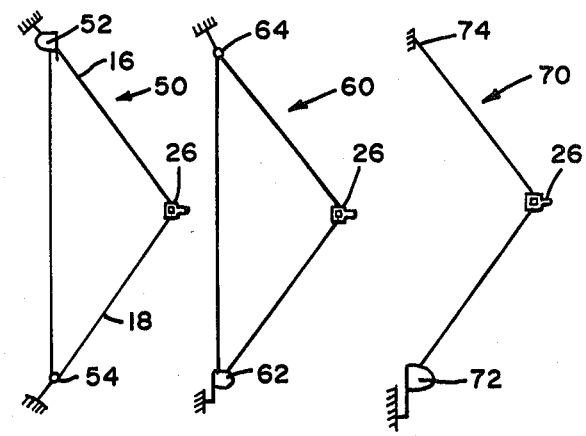
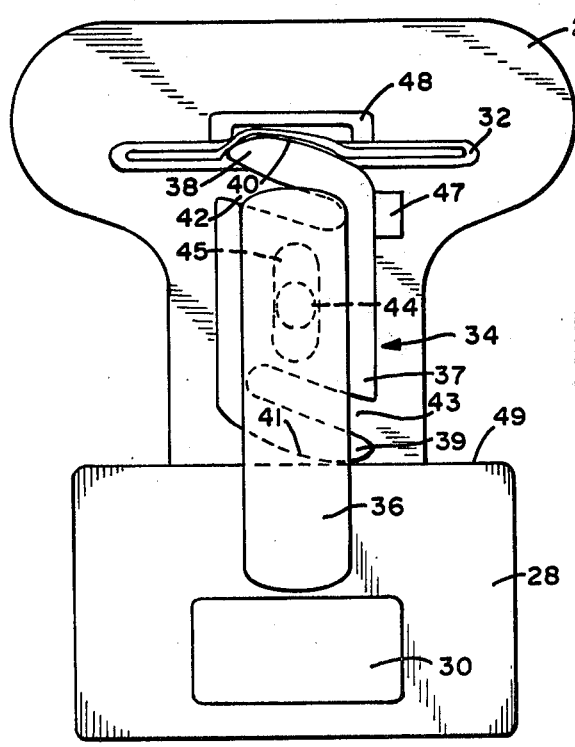
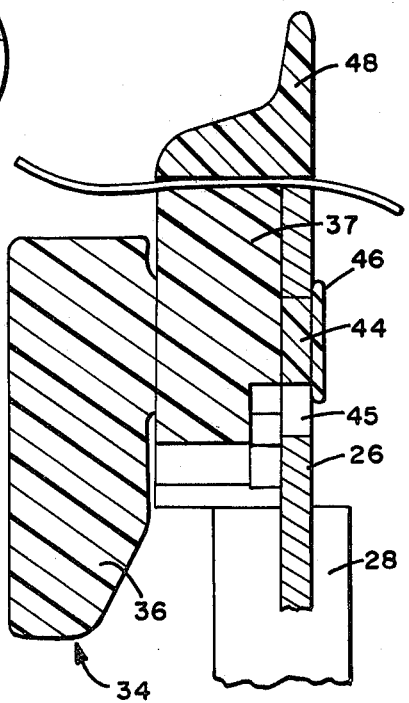

SEAT BELT COMFORT DEVICE

DESCRIPTION

BACKGROUND OF THE INVENTION

1. Field of the Invention

This invention relates to a comfort mechanism to relieve tension in a seat belt system.

2. Description of the Prior Art

Tension eliminators are commonly utilized to eliminate the tension exerted by the rewind spring of a seat belt retractor against the upper torso of the wearer. Presently commercial devices are directly attached to the seat belt retractors and require numerous components, often of a high tolerance. Such tension eliminators require a door actuated mechanism to automatically disengage the rewind lock-out feature and permit retraction of the webbing. As a consequence, the retractors are mounted in the vehicle close to the vehicle door. Furthermore, it is possible to inadvertently have an excessive amount of slack in the seat belt. Comfort mechanisms wherein the tension is reduced rather than eliminated have also been suggested. It has been suggested to provide a manual tension eliminator in a guide clip in a passive seat belt system as disclosed in commonly assigned U.S. Patent Application Ser. No. 62,276, filed July 30, 1979.

It would be desirable to provide a comfort mechanism for a seat belt retractor which does not require door actuation and which would avoid inadvertent amounts of excess slack being introduced into the system. In addition, it would be desirable to provide a relatively low cost comfort mechanism which did not involve high tolerances.

SUMMARY OF THE INVENTION

In accordance with this invention, there is provided a vehicle seat belt system comprising:

seat belt webbing adapted to at least extend over the torso of an occupant seated in a seat in said vehicle;

rewind means biasing said webbing in a rewind direction and permitting extension of said webbing against said biasing force, said biasing force causing said webbing to exert pressure against the torso of said occupant;

a tongue and buckle assembly associated with said seat belt webbing and adapted to provide a releasable interconnection for fastening said webbing about said occupant; and comfort means associated with said tongue and buckle assembly and actuable to at least reduce the pressure exerted by said webbing against the torso of said occupant.

Preferably, the comfort means is a tension elimination device which is manually actuated and mounted on a tongue of a seat belt buckle assembly and includes means to clamp the webbing in frictional engagement to prevent the webbing from being rewound and thereby eliminate the tension associated with the shoulder belt. The tension eliminator is preferably automatically disengaged when the tongue and buckle assembly are connected and disconnected.

BRIEF DESCRIPTION OF THE DRAWINGS

FIG. 1 is a view of one embodiment of the seat belt system of this invention.

FIG. 2 is a plan view of a tension elimination device at the tongue and buckle interconnection, in the actuated position.

FIG. 3 is a side view of the tension eliminator of FIG. 2.

FIG. 5 is a schematic view of a second embodiment of the seat belt system of this invention.

FIG. 6 is a schematic view of a third embodiment of the seat belt system of this invention.

FIG. 7 is a schematic view of a fourth embodiment of the seat belt system of this invention.

DESCRIPTION OF THE PREFERRED EMBODIMENTS

Figure 4:
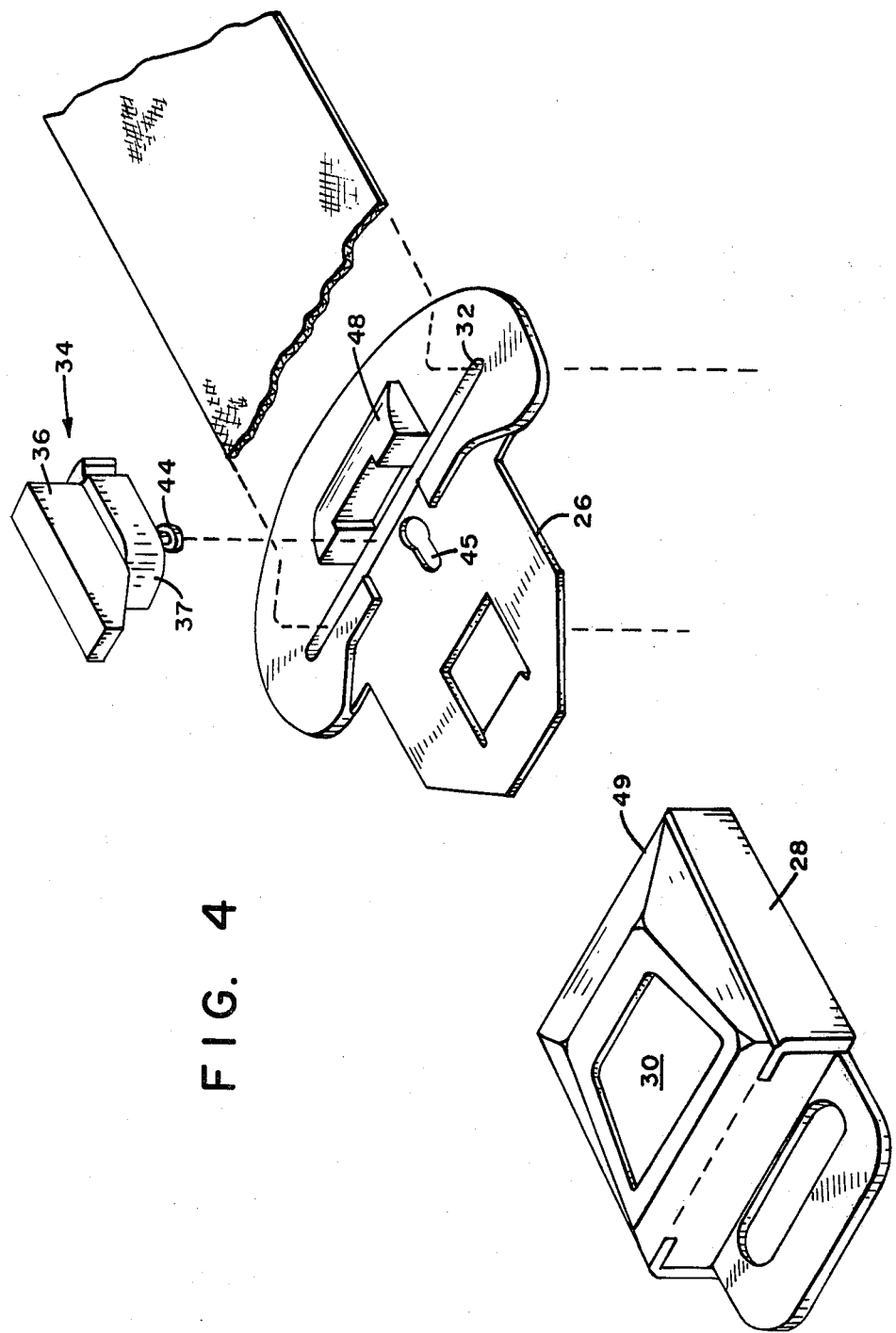
FIG. 4 is an exploded view of the device of FIG. 2.

With reference to FIG. 1, there is shown a seat belt system, generally indicated at 10, for a vehicle seat 12 which is adjacent to a frame 14 (such as a "B" pillar) in the vehicle. A continuous length of seat belt webbing provides a shoulder belt 16 and a lap belt 18. The webbing extends from a dual belt retractor 20 mounted in an intermediate vertical position with respect to seat 12 on frame 14 and upwards to a run-through bracket 22 (commonly referred to as a D-ring) mounted on frame 14 at a position above the height of a shoulder of an occupant when seated in seat 12. The webbing extends from D-ring 22 diagonally downwards across seat 12 to form a shoulder belt portion 16 and then extends through a tongue and buckle assembly back through seat 12 to form lap belt portion 18. The webbing then extends through a lower D-ring 24 mounted on the floor of the vehicle or on frame 14 and thereafter upwards to retractor 20. Such dual belt retractors are well known in the art and accordingly they are not described in detail herein. Reference is made to the following U.S. Pat. Nos. which disclose such retractors: 4,065,156; 4,108,471; 4,113,280; 4,116;402; 4,130,252; 4,130,255; and 4,159,084.

The tongue and buckle assembly includes a conventional seat belt tongue 26 of the slip or adjust type and a cooperating buckle 28 which is mounted inboard of seat 12 to the floor or other structural part of the vehicle. Buckle 28 is provided with a locking means (not shown) which cooperates with an aperture in tongue 26 (also not shown) to maintain tongue 26 in an engaged position, as is conventional, and a push button 30 or similar actuator for release of tongue 26 from buckle 28. Tongue 26 includes a slot 32 through which the seat belt webbing extends. Tongue 26 may be provided with a conventional adjust bar for adjusting the position of the webbing about the occupant.

In accordance with this invention, a comfort means, generally indicated at 34, is provided at the tongue and buckle interconnection. As shown, comfort means 34 is mounted on the forward part of tongue 26 in front of slot 32 (but rearward of the locking aperture). Comfort means 34 is shown in the form of a movable clamp which can pinch the webbing adjacent the rear wall of slot 32 to prevent the webbing from being retracted upwards due to the rewind force of the rewind spring (not shown) associated with retractor 20.

Clamp 34 has a generally rectangular shape and includes a top portion 36 for manual grasping by the occupant and a lower portion 37 which includes a first end portion 38 and a second end portion 39. Cam face surfaces 40 and 41 are provided on end portions 38 and 39, respectively, and slots 42 and 43 are provided in lower portion 37 to provide resiliency and a spring action to end portions 38 and 39. A post 44 extends downwardly from lower portion 37 through oval slot 45 in tongue 26 and is held in place by cap 46. Clamp 34 is both pivotable and slidable in slot 45 since the slot is larger than post 44. One or more upwardly extending stops 47 is provided on tongue 26 to limit rotation of clamp 34 by engaging the side of lower portion 37.

A plastic upward extension 48 is provided adjacent to and above the rear wall of slot 32 of tongue 26. Cam face surface 40 is adapted to engage the webbing and pinch or clamp the webbing against upward extension 48. This position (engaging position) is shown in FIG. 2. Clamp 34 is manually rotatable into its engaging position, at which cam face surface 41 engages a forward portion 49 of buckle 28. Engagement of cam face surface 41 with portion 49 maintains the clamp in its engaged position. Clamp 34 is normally in its non-engaged position which is slightly counter-clockwise of the position shown in FIG. 2 and at which cam face surface 40 is approximately parallel to the surface of the webbing and cam face surface 41 is approximately parallel to forward portion 49. Clamp 34 is pivotable into and out of its engaged and non-engaged position.

Clamp 34 is manually movable to its engaged position when the tongue and buckle are interengaged and is automatically moved to such position when tongue 26 is not inserted in buckle 28.

In operation, when the occupant sits in seat 12, tongue 26 is inserted into buckle 28 so that the seat belt webbing is positioned about the occupant in a restraining position. Should clamp 34 be in its engaged position, upon insertion of tongue 26 into buckle 28, contact of cam surface 41 of clamp 34 against portion 49 of buckle 28 pivots clamp 34 counter-clockwise to its non-engaged position. The occupant then extends a slight amount of webbing from retractor 20 to provide some slack in shoulder belt portion 16 and then rotates clamp 34 in a clockwise direction as viewed in FIG. 2 to its engaged position. The effect of the rewind spring of retractor 20 is therefore effectively eliminated due to the clamping action at the tongue 26 and shoulder belt portion 16 lies against the upper torso of the occupant without exerting an annoying force thereagainst.

The occupant may rotate clamp 34 out of its engaged tension eliminating position at any time. Upon release of tongue 26 from buckle 28 effected by depressing push button 30, clamp 34 is rotated counter-clockwise due to the expansion of cam face surfaces 40 and 41 outwardly, as well as a forward movement of post 44 in slot 45. Clamp 34 is thus moved to its non-engaged position.

It should be understood that clamp 34 need not be a pivotable clamp but alternatively could be a slidable or otherwise movable clamp. Also, it is to be understood that clamp 34 may be mounted on buckle 28 as opposed to tongue 26. Furthermore, the comfort means need not be in the form of a clamp but may take the form of a Velcro fastener to maintain the webbing in a fixed position with respect to slip tongue 26. Such a fastener is shown, for example, in the aforementioned U.S. Patent Application.

With reference to FIG. 5, there is disclosed a second embodiment of this invention generally indicated at 50, wherein a dual belt retractor 52 is mounted on the frame of the vehicle adjacent to seat 12 at a location above the shoulder of a seated occupant (similar to the location of D-ring 22 in FIG. 1). In this case, a lower D-ring 54 is provided adjacent to the lower portion of seat 12. Tongue 26 is in the same position as in FIG. 1. Retractor 52 normally exerts an upwards biasing force on the shoulder belt 16 and to eliminate such annoying force, comfort means 34 may be actuated as in the previous embodiment to effectively block out the rewind force of retractor 52.

With respect to FIG. 6, there is shown a third embodiment of the present invention, generally indicated at 60, in which a seat belt retractor 62 is mounted on a frame of the vehicle adjacent to the lower portion of seat 12, in a location similar to that of D-ring 24 in FIG. 1. In this case, an upper D-ring 64 is provided in a location similar to upper D-ring 22 in FIG. 1. In this embodiment, retractor 62 normally exerts a rewind force against the torso of a seated occupant through D-ring 64 and to eliminate such annoying rewind force, comfort means 34 can be actuated in the buckle and tongue assembly as in the previous embodiments. In this embodiment, retractor 62 is also a dual belt retractor.

With reference to FIG. 7, there is shown a fourth embodiment of the present invention, generally indicated at 70, in which a single belt retractor 72 is mounted on the frame of the vehicle adjacent to the lower portion of seat 12 and extends through the tongue and buckle assembly to provide lap and shoulder belt portions and terminates in a fixed connection 74 on a frame portion of the vehicle. In this embodiment, retractor 72 normally exerts a rewind force against the shoulder of the occupant through the slip tongue 26. To eliminate such annoying rewind force the occupant can manually move comfort means 34 to its actuated position in order to eliminate the tension exerted by retractor 72.

It should be noted that in all of the embodiments referred to above the retractors are preferably of the emergency locking type which are actuated in response to a deceleration of the vehicle, acceleration of the seat belt webbing or both.

It can be seen that in accordance with this invention a comfort means, preferably a tension elimination device, is provided at the tongue and buckle interconnection to create friction against the webbing which relieves the tension associated with the retractor acting on the shoulder belt of the system. The device preferably is manually actuable so that the occupant knows that the tension elimination is effective in the system. In addition, the device is desirably automatically disengaged upon insertion of the tongue into the buckle so that each time the occupant buckles up, a conscious effect must be exerted to actuate the tension elimination device if desired. Furthermore, the device is preferably automatically disengaged upon separation of the tongue from the buckle.

As apparent from the above, the present invention provides a comfort means at the tongue and buckle interconnection. This may be effected since a rewind force is also being exerted on the lap belt portion towards the seat belt retractor and through the tongue. Such force acts in a direction opposite to the rewind tension of the shoulder belt. However, the present invention does not require a lap belt portion in the system since, for example, a single diagonal shoulder belt may be provided with a retractor on the shoulder belt side of the tongue and a rewind device on the opposite side of the tongue. Such a rewind device may be located on the opposite lower side of the seat.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

I claim:

1. A vehicle seat belt system comprising:
    seat belt webbing adapted to at least extend over the torso of an occupant seated in a seat in said vehicle;
    rewind means exerting a biasing force and biasing said webbing in a rewind direction and permitting extension of said webbing against said biasing force, said biasing force causing said webbing to exert pressure against the torso of said occupant;
    a tongue and buckle assembly associated with said seat belt webbing to provide a releasable interconnection for fastening said webbing about said occupant; and
    comfort means associated with said tongue and buckle assembly and actuable to at least reduce the pressure exerted by said webbing against the torso of said occupant;
    said comfort means comprising a contact means for contacting said webbing, said contact means normally being located at a first position at which said webbing is not contacted by said contact means, said contact means being manually movable to a second position at which said webbing is contacted, said contact means including means responsive to release of said tongue from said buckle to automatically move said contact means from said second position to said first position to thereby automatically disengage said comfort means.

2. The vehicle seat belt system of claim 1 wherein said comfort means is a tension eliminating means effective when actuated to eliminate the pressure exerted by said webbing against the torso of said occupant.

3. The seat belt system of claim 2 wherein said tension eliminating means is mounted on said tongue.

4. The seat belt system of claim 3 including means on said buckle to maintain said tension eliminating means in a portion to prevent rewind of said webbing when said tongue is interengaged with said buckle.

5. The seat belt system of claim 4 wherein said tension eliminating means comprises a web clamping device.

6. The seat belt system of claim 5 including a slot on said tongue through which said webbing extends, said web clamping device actuable to clamp said webbing adjacent to said slot to prevent said rewind of said webbing.

7. The seat belt system of claim 6 wherein said web clamping device is pivotable on said tongue and includes a first portion operable to contact said buckle and a second position operable to contact and clamp said webbing.

8. The seat belt system of claim 7 wherein said first portion of said web clamping device includes a cam surface and wherein contact of said cam surface with said buckle is effective to move said web clamping device to a position at which it does not contact said webbing upon insertion of said tongue into said buckle.

9. The seat belt system of claim 8 wherein said first portion of said web clamping device is operable to contact said means on said buckle when said tongue is interengaged with said buckle, whereby said web clamping device is held in engagement with said webbing after being manually moved into contact with said webbing.

10. The seat belt system of claim 1 wherein said webbing includes shoulder and lap portions and is adapted to extend across the torso and lap regions of said occupant.

11. The seat belt system of claim 10 wherein said webbing is a continuous webbing and said rewind means comprises a dual belt retractor upon which both said shoulder and lap belt portions are wound.

12. The seat belt system of claim 12 including a seat in said vehicle, said buckle being mounted to said vehicle on the inboard side of said seat, said retractor being mounted on the outboard side of said seat, and said webbing extending and being slidable through said tongue.

13. The seat belt system of claim 12 wherein said retractor is mounted on said vehicle at a height between the top and bottom of said seat, and including run-through brackets mounted on said vehicle on the outboard side of said seat above and below the height of said retractor, said webbing extending through said run-through brackets.

14. The seat belt system of claim 1 wherein said rewind means comprises a single belt retractor upon which said webbing is wound.

15. The seat belt system of claim 2 including a contact surface on said contact means, said contact surface being effective to automatically disengage said tension eliminating means when said tongue is inserted into said buckle.

16. The seat belt system of claim 1 wherein said means on said comfort means responsive to release of said tongue from said buckle comprises a cam surface effective to retain said comfort means in its second position when said tongue and buckle are engaged and to release said comfort means from said second position when said tongue is disengaged from said buckle.

17. A seat belt tongue and buckle assembly comprising:
    a buckle having a contact surface thereon; and
    a tongue insertable in said buckle, said tongue having a forward portion adapted to be retained by said buckle, a slot adjacent its rearward portion for receipt of seat belt webbing therethrough and a comfort means disposed on said tongue between said forward portion and said slot,
    said comfort means being manually pivotable between a normal first position and a second position at which said comfort means is in contact with said webbing, said comfort means having a forward cam surface and a rearward cam surface, said rearward cam surface adapted to contact said webbing when said contact means is in its second position to restrict motion of said webbing through said slot, said forward cam surface adapted to engage said contact surface on said buckle following pivoting of said comfort means to its second position after insertion of said tongue into said buckle, whereby said comfort means is retained in its second position, said comfort means being automatically movable from its second position to its first position upon disengagement of said tongue from said buckle and upon insertion of said tongue into said buckle.

* * * * *

UNITED STATES PATENT AND TRADEMARK OFFICE
CERTIFICATE OF CORRECTION

PATENT NO. : 4,294,467
DATED : October 13, 1981
INVENTOR(S) : R.L. Frantom

It is certified that error appears in the above—identified patent and that said Letters Patent are hereby corrected as shown below:

Column 5, line 42, "portion" should be -- position --;

line 54, "position" should be -- portion --.

Signed and Sealed this

Twenty-sixth Day of January 1982

[SEAL]

Attest:

GERALD J. MOSSINGHOFF

Attesting Officer         Commissioner of Patents and Trademarks